(12) United States Patent
Krupa et al.

(10) Patent No.: US 7,441,460 B2
(45) Date of Patent: Oct. 28, 2008

(54) VACUUM REGULATOR WITH TWO GAUGES

(75) Inventors: Michael Andrew Krupa, Northampton, PA (US); James J. Labert, Quakertown, PA (US)

(73) Assignee: Precision Medical, Inc., Northampton, PA (US)

( * ) Notice: Subject to any disclaimer, the term of this patent is extended or adjusted under 35 U.S.C. 154(b) by 0 days.

(21) Appl. No.: 11/557,308

(22) Filed: Nov. 7, 2006

(65) Prior Publication Data

US 2008/0105058 A1    May 8, 2008

(51) Int. Cl.
*G01L 9/00*    (2006.01)
(52) U.S. Cl. ........................................... 73/753
(58) Field of Classification Search ............... 73/753; 33/784; 604/119
See application file for complete search history.

(56) References Cited

U.S. PATENT DOCUMENTS

| 1,826,397 | A | 10/1931 | Hans |
| 1,957,037 | A | 5/1934 | Beck |
| 2,087,418 | A | 7/1937 | Campbell |
| 3,447,380 | A | 6/1969 | Martin |
| 3,619,574 | A | 11/1971 | Mindheim |
| 4,008,618 | A | 2/1977 | Younkin |
| 4,289,382 | A | 9/1981 | Clark |
| 4,654,029 | A | 3/1987 | D'Antonio |
| 4,783,772 | A | 11/1988 | Umemoto et al. |
| 6,014,905 | A | 1/2000 | Possati et al. |
| 6,412,187 | B1 * | 7/2002 | Sasaki et al. .................. 33/784 |
| 6,910,441 | B2 | 6/2005 | Jang |
| 6,960,190 | B2 * | 11/2005 | Stinson ...................... 604/119 |
| 2004/0267215 | A1 | 12/2004 | Charlez et al. |
| 2006/0107748 | A1 | 5/2006 | Coleman |

FOREIGN PATENT DOCUMENTS

DE    27 26 790    1/1979
GB    11115    4/1895

OTHER PUBLICATIONS

User Manual—Vacuum Regulator Model Series: PM3300 & PM3400, Precision Medical, Inc.
Datasheet—Vacuum Regulators Model Series: PM3100HV and PM3300HV, Precision Medical, Inc.

* cited by examiner

*Primary Examiner*—Jewel V Thompson
(74) *Attorney, Agent, or Firm*—Winston & Strawn LLP; Richard P. Gilly

(57) ABSTRACT

A vacuum regulator includes two gauges, such as an electronic gauge and a mechanical gauge, each adapted to take a measurement associated with a vacuum. A digital display is associated with the electronic gauge, and an analog display is associated with the mechanical gauge. The displays are secured in relative proximity to each other and oriented to enable a user of the regulator to obtain a reading corresponding to the vacuum from either of the displays.

21 Claims, 3 Drawing Sheets

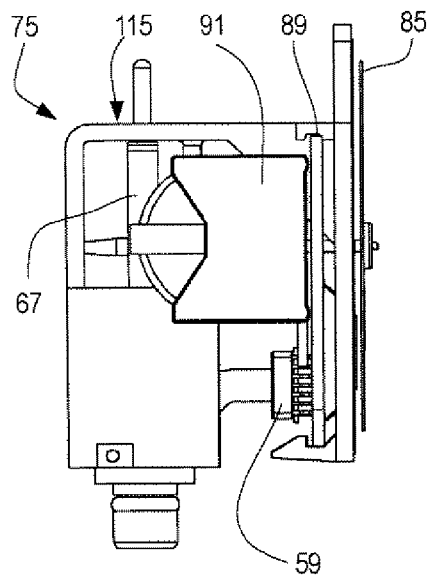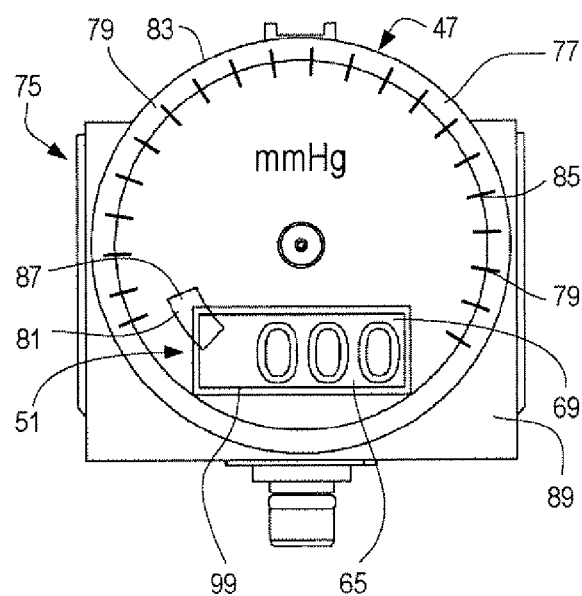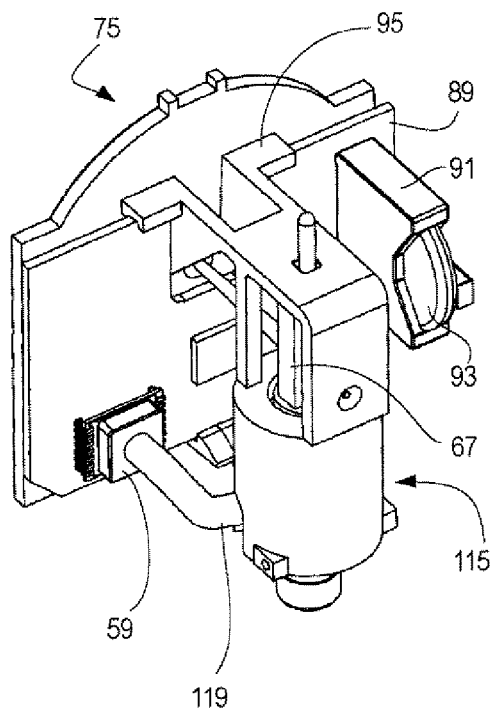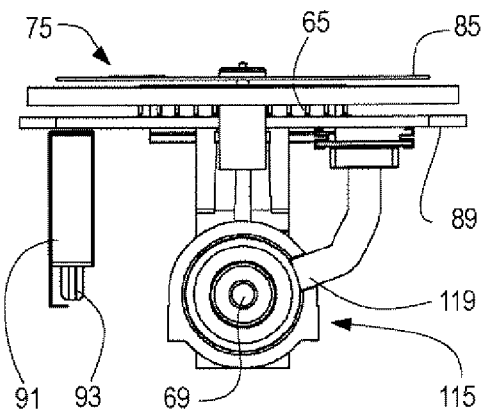

VACUUM REGULATOR WITH TWO GAUGES

BACKGROUND

This disclosure relates to vacuum regulators.

SUMMARY

According to one implementation, a vacuum regulator includes two gauges, an electronic gauge and a mechanical gauge, each adapted to take a measurement associated with a vacuum. A digital display is associated with the electronic gauge, and an analog display is associated with the mechanical gauge. The displays are secured in relative proximity to each other and oriented to enable a user of the regulator to obtain a reading corresponding to the vacuum from either of the displays.

According to another implementation, a vacuum regulator includes a housing which is adapted to be mounted to a wall. The housing has an inlet defined therein which connects to a vacuum system. One or more windows are defined in the housing. A vacuum controller having a control knob is operatively connected to the inlet. A gauge module is located within the housing and in pneumatic communication with the inlet. The gauge module includes an electronic gauge, a mechanical gauge, and two corresponding displays, each display adapted to display a measurement associated with the vacuum. The displays are visible through one or more windows defined in the housing.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 4 is a front, elevational view of a gauge module suitable for a vacuum regulator.

FIG. 5 is a rear perspective view of the gauge module of FIG. 4.

FIG. 6 is a bottom plan view of the gauge module of FIGS. 4 and 5.

FIG. 7 is a side elevational view of the gauge module of FIGS. 4-6.

Like reference symbols in the various drawings indicate like elements.

DETAILED DESCRIPTION

Figure 1:
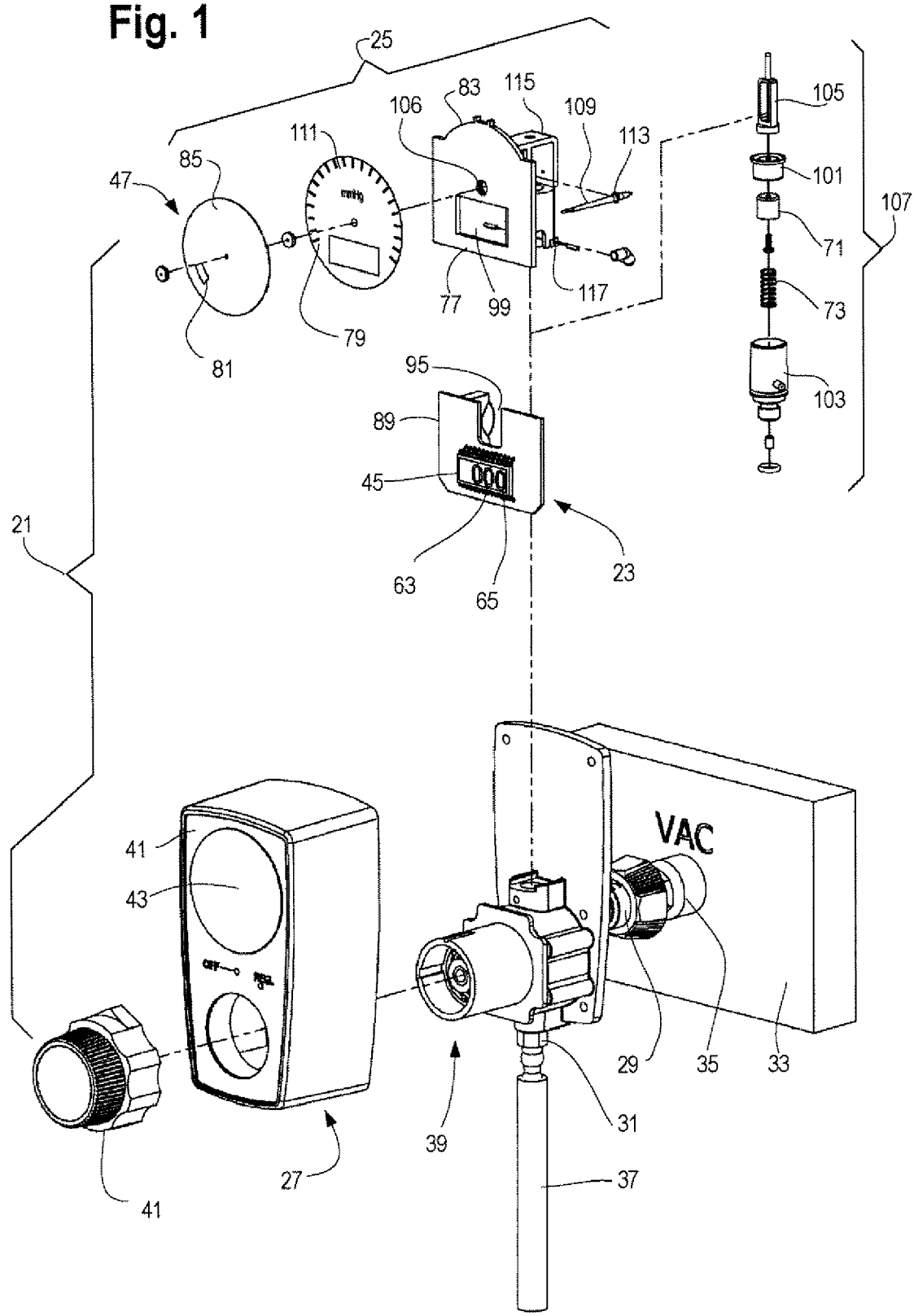
FIG. 1 is an exploded, perspective view of one implementation of a vacuum regulator.

Referring now to FIG. 1, a vacuum regulator 21 includes two gauges, an electronic gauge 23 and a mechanical gauge 25. Each of the gauges measures the vacuum delivered by or otherwise associated with vacuum regulator 21. In the environment shown in FIG. 1, vacuum regulator 21 includes a housing 27 with an inlet 29 and an outlet 31 defined therein. Although the inlet and outlet can assume any number of forms, in the illustrated implementation, inlet 29 is adapted to connect to a vacuum system, such as a hospital vacuum system, in which regulator 21 is mounted to a wall 33 having a vacuum nozzle 35 defined therein. Outlet 31 is connected so as to perform any number of vacuum-related applications on one or more patients. Such applications are generally accomplished through a variety of vacuum devices, such as suction units, collection containers, and the like, which devices are often connected by means of hose 37 shown herein.

Vacuum regulator 21, when configured for use with vacuum systems, may assume a variety of different forms and include a variety of related functions. Furthermore, regulator 21 may be configured to deliver vacuum in any number of vacuum ranges or in different modes, such as continuous, continuous-intermittent, pediatric, and any number of other applications. Similarly, regulator 21 may work with unregulated vacuum from a central system or be adapted for use with a regulated vacuum source.

A vacuum controller 39 is associated with regulating the amount of vacuum transmitted to the patient through outlet 31, and thus has any number of suitable settings associated with it, depending on the application. In the case of an unregulated vacuum source, vacuum controller 39 is configured to regulate the amount of vacuum so that the appropriate level is delivered to the patient. In this implementation, vacuum controller 39 has a control knob 41 associated therewith, which is located proximate to housing 27 and is rotatable to a desired setting, such setting generally associated with a selected vacuum or mode of delivering such vacuum. The measurements of both of the gauges 23, 25 are associated with the vacuum delivered by vacuum controller 39 and its associated settings.

Regulator 21 has an outwardly oriented surface 41 defined in housing 27. At least one window 43 is defined in outwardly oriented surface 41. Electronic gauge 23 has a digital display 45 associated therewith, whereas mechanical gauge 25 has an analog display 47 associated therewith. Displays 45 and 47 are secured in relative proximity to each other and oriented so that a user of regulator 21 can obtain a reading corresponding to the vacuum being measured from either or both of the displays. In this implementation, both of the displays 45, 47 are located so as to be visible through window 43 of outwardly oriented surface 41. Separate windows for each of the gauges are also contemplated.

Figure 2:
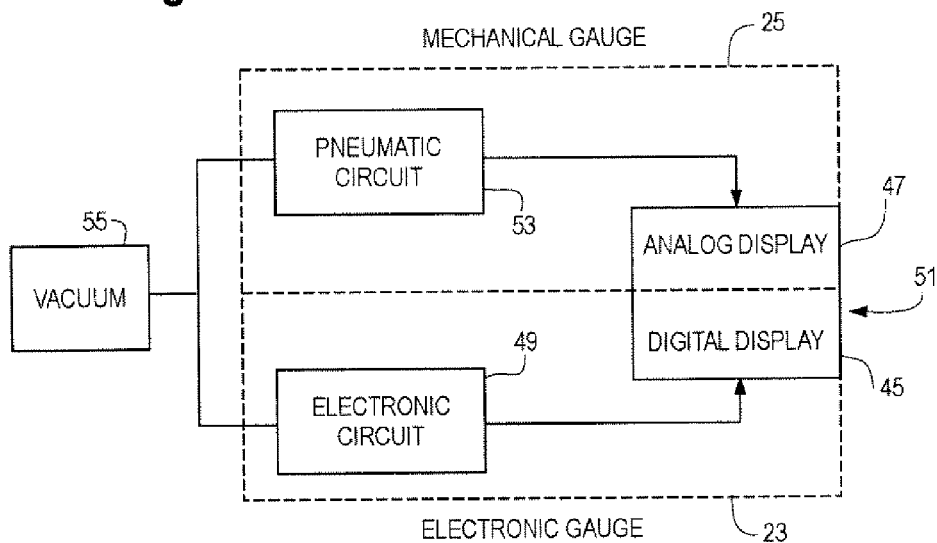
FIG. 2 is a schematic diagram of certain aspects of a vacuum regulator.

FIG. 2 is a schematic diagram of certain general features associated with vacuum regulator 21. Electronic gauge 23 includes an electronic circuit 49. Electronic circuit 49 includes suitable components, programming, and/or a combination of the two for processing inputs (e.g. signals) associated with the vacuum. Electronic circuit 49 is electrically connected to digital display 45 for displaying output from electronic circuit 49 corresponding to the vacuum it has measured.

Mechanic gauge 25 makes use of a pneumatic circuit 53, which circuit responds to the vacuum so as to measure it. Pneumatic circuit 53 is operatively connected to a suitable analog display 47 to provide a visual indication of the measurement of the vacuum taken by pneumatic circuit 53.

By virtue of displays 45 and 47 being located proximate to each other, the measurements of both gauges 23, 25 may be read from a single display surface 51. However, the measurements by gauges 23, 25 are independent of each other. More specifically, although electronic circuit 49 and pneumatic circuit 53 may be exposed to the same vacuum, such as vacuum delivered into regulator 21, the respective circuits 49, 53 remain substantially independent, and thereby each takes an independent measurement of vacuum to which it is exposed.

Figure 3:
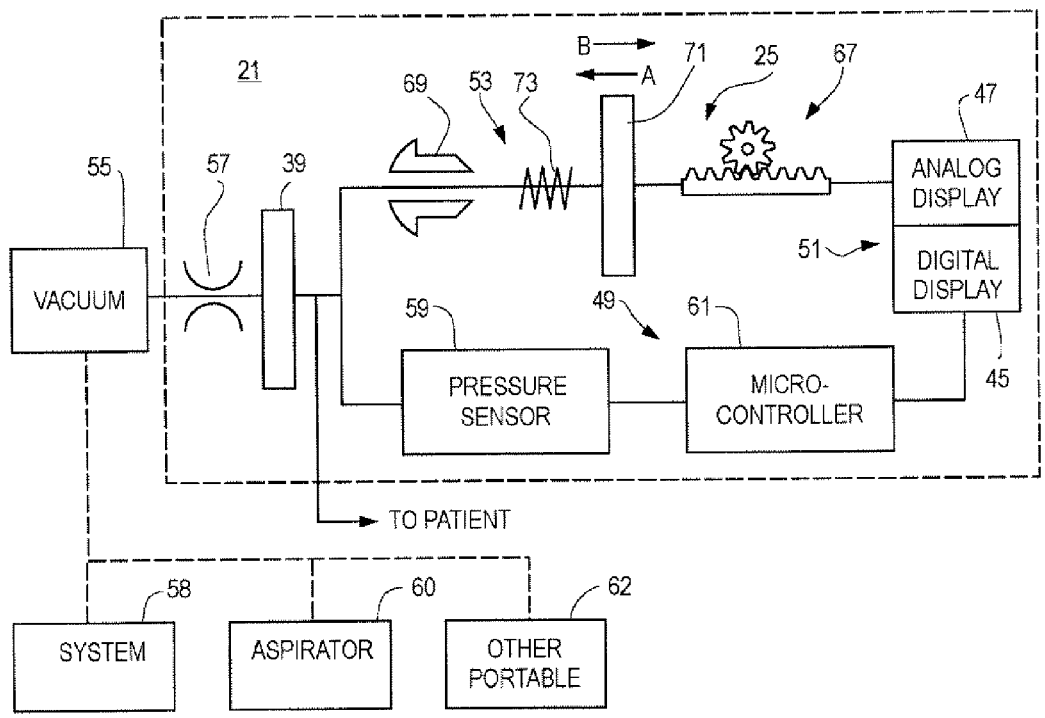
FIG. 3 is a schematic of a vacuum regulator having both electronic and pneumatic circuits.

FIG. 3 is a schematic of one implementation of a vacuum regulator. Regulator 21 may be pneumatically connected to vacuum 55 by any suitable means, here shown as port 57, which port may be part of inlet 29 defined in housing 27 (FIG. 1). Vacuum 55 may be produced by any of a variety of apparatuses or devices useful to patients and other users, including not only a vacuum system 58 (e.g., a hospital vacuum system), as discussed previously, but also an aspirator 60 or other portable vacuum systems 62.

Electronic circuit 49 includes a pressure sensor 59, operatively connected to the vacuum to be measured so as to sense the vacuum thereof. Pressure sensor 59 processes analog signals corresponding to the vacuum to be measured in a variety of suitable ways so as to accomplish a digital conversion of such signals. The signals are appropriately filtered so as to produce an appropriate (e.g., compatible) signal output for further processing described herein. In addition, pressure sensor 59 includes suitable memory (such as programmable read-only memory), to retain calibration and temperature values appropriate to the particular application.

Pressure sensor 59 is electrically connected to a suitable microcontroller 61. Microcontroller 61 receives as input appropriate signals from pressure sensor 59 corresponding to the vacuum being measured. Microcontroller 61 may also perform various other control functions, including power regulation, conversions, and other gate-keeping functions suitable to accomplish vacuum measurement by electronic circuit 49. Microcontroller 61 may receive periodic digital input from pressure sensor 59. After conversion or other appropriate processing of such signals, microcontroller 61 functions to display a corresponding reading in the designated units of vacuum on a suitable digital display 45. Power to pressure sensor 59, microcontroller 61, and digital display 45 is provided by a suitable battery.

Pressure sensor 59 may be a surface mount device ("SMD") which includes a high-resolution factory calibrated pressure sensor therein. One suitable module has a pressure range of minus 400 to 1000 mbar, with a 0.1 mbar resolution, factory calibrated, with a three-wire serial interface, and adapted for low voltage/low power usage. The SMD gauge pressure module, Model Number MS5536, from Intersema, is one example of a suitable pressure sensor 59. The implementation with this module would provide digital pressure and temperature information as 16-bit data words. In addition, there are 64 bits of individually calibrated compensation coefficients stored on-chip for software compensation of processing spread and temperature effects. Additionally, refresh rate and average current consumption can be defined by suitable programming of the module.

Any number of electronic components may perform the functions of microcontroller 61. One suitable microcontroller is available from the family of mixed signal microcontrollers MSP430x41x, from Texas Instruments. In this implementation, the microcontroller is operable in a low power mode to optimize battery life.

Digital display 45 may be an LCD, LED, or similar numerical display. One suitable digital display is LCD-S301C31TR, available from Lumex, Inc., and having a set of three digits (reference 63) visible on an outwardly oriented surface 65 thereof (FIG. 1).

Mechanical gauge 25 includes pneumatic circuit 53 connected to respond to the vacuum entering regulator 21; a suitable analog display 47 for displaying a corresponding measurement of such vacuum; and a suitable mechanism, here shown as a rack and pinion assembly 67, for transmitting the response of pneumatic circuit 53 to analog display 47. Pneumatic circuit 53, in this implementation, receives vacuum to be measured through a suitable opening 69. The vacuum received through opening 69 acts on a suitable movable element 71. Movement of element 71 depends on the amount of vacuum to which pneumatic circuit 53 is exposed. More particularly, movable element 71 is urged in a first direction A, against the bias of a spring element 73, in response to sensing an increase in vacuum, and moves in the opposite direction B as a result of decreasing vacuum. Movement in the direction B may be partly due to the biasing force of spring 73, as well as the reduction in vacuum.

The movement of element 71 is mechanically transmitted to analog display 47 by any suitable means, including the rack and pinion assembly 67. Movement of element 71 causes movement of one of the elements of rack and pinion assembly 67, as discussed in more detail subsequently, and such movement translates into a discernable change in what is displayed on analog display 47. Although a rack and pinion assembly 67 is suitable for transmitting the results of pneumatic circuit 53 to analog display 47, it will be appreciated that other mechanisms are also suitable, including, for example, other types of assemblies for translating the vacuum into a reading for the mechanical gauge, and also including bourdon-type or bellows-type mechanisms responsive to vacuum.

Further details of vacuum regulator 21 will be described with reference to FIGS. 1, and 4-7. Electronic gauge 23 and mechanical gauge 25, along with their corresponding displays 45, 47, may be advantageously configured into a gauge module 75. Such gauge module 75 is adapted to be easily positioned within any suitable housing and suitably connected so as to be placed in pneumatic communication with a vacuum to be measured. As such, gauge module 75 may be suitable for retrofit into any number of configurations of currently available vacuum regulators.

Analog display 47 includes a gauge face 77 suitably sized and indexed to include a scale 79 of vacuum readings likely to be encountered by regulator 21. A suitable indicator 81 is located in operative proximity to scale 79. Indicator 81 and scale 79 are secured as to be movable relative to each other.

As shown in FIGS. 4-7, scale 79 extends over approximately 270° of arc on a circular perimeter 83 of gauge face 77. Indicator 81 comprises a colored segment on a transparent disc 85, transparent disc 85 being movable by rack and pinion assembly 67 (FIG. 3) relative to scale 79. Other configurations of gauge face 77, scale 79, and indicator 81 are possible, such as a semi-circular gauge face, and an indicator in the form of a pointer.

Components of electronic gauge 23 are mounted to circuit board 89, which circuit board extends behind gauge face 77 and substantially parallel thereto. As best seen in FIG. 5, pressure sensor 59 is appropriately mounted and electrically connected at any suitable location on circuit board 89, which is preferably imprinted with conductive material to accomplish the desired connections between the electronic components. Battery holder 91 is also secured to circuit board 89 at an appropriate location and has an opening oriented to allow relatively easy placement and replacement of a battery 93 therein. As best seen in FIGS. 6 and 7, microcontroller 61 is appropriately mounted and electrically connected to circuit board 89, so as to be in operative communication with other components.

As best seen in FIG. 6, digital display 45 is electrically connected and mounted to circuit board 89 on the opposite surface from the other electronic components, so that its outwardly oriented surface 65 has substantially the same orientation as gauge face 77. Circuit board 89 includes a notch 95 defined at its upper edge. This enables a greater portion of the surface area of circuit board 89 to be positioned behind gauge face 77, and thereby reduces certain overall dimensions of gauge module 75. In the same vein, the width of circuit board 89 substantially corresponds to the diameter of gauge face 77. Other shapes and configurations of circuit board 89 are possible, as are other arrangements and locations of electronic components relative to each other, or relative to gauge face 77, and such alternative arrangements may be equally suitable to those which have been illustrated and described.

The set of three digits 63 on outwardly oriented surface 65 of digital display 45 are positioned to align with a window 99 defined in gauge face 77. Although other locations are possible, window 99 has been defined completely within circular perimeter 83 of gauge face 77. In this way, digital display 45 and analog display 47 are not only proximate to each other, but overlap with each other. This proximate configuration, including the overlapping configuration illustrated, enables both measurements to be viewed from the same display face 51. The overlapping configuration makes gauge module 75 more compact in certain dimensions. A user may thus obtain readings corresponding to the vacuum from either the set of digits 63 or the position of the indicator 81 relative to scale 79.

Referring particularly to FIG. 1, mechanical gauge 25 includes a movable element 71 (such as a piston), which, along with other components, forms a movable element assembly 107. Assembly 107 includes a spring element 73 and a diaphragm 101 located on opposite sides of element 71. Those components are received in a suitably sized housing 103. One end of housing 103 has port 57 defined therein, whereas the opposite end of housing 103 has rack 105 extending outwardly therefrom.

Gauge face 77 has a central aperture 106 defined therein through which a spindle 109 extends. Scale 79 comprises imprinted indicia on a circular sheet 111, which sheet overlies the outer surface of gauge face 77. The end of spindle 109 extends through aperture 107, through sheet 111 and into transparent disk 85. Transparent disk 85 is suitably mounted to spindle 109 to turn when spindle 109 is turned. To that end, spindle 109 has a pinion 113 secured thereto, integrally formed therein, or otherwise provided. Movable element assembly 107 and spindle 109 are suitable mounted and located relative to each other so that movement of rack 105 causes rotation of pinion 113 which, in turn, causes movement of indicator 81 on transparent disk 85.

In this implementation, assembly 107, spindle 109, and gauge face 77 are suitably secured to a frame 115 which positions the foregoing elements in operative proximity to each other. Accordingly, when gauge module 75 is appropriately connected to a vacuum source, movable element assembly 107 is exposed to vacuum through port 57, causing movement of rack 105, and corresponding rotation of indicator 81 relative to scale 79.

Rack and pinion assembly 67 moves in a plane substantially parallel to gauge face 77, communicating such motion to indicator 81 through spindle 109. Pneumatic circuit 53, similarly, is positioned vertically below rack and pinion assembly 67 and suitably aligned therewith to directly translate movement of movable element 71 into motion of rack 105. This construction permits digital display 45 to be located between movable element housing 103 and gauge face 77, thereby rendering gauge module 75 more compact. In the same vein, circuit board 89 can be interposed between assembly 107 and gauge face 77.

Gauge module 75 is suitably configured so that pressure sensor 59 is in pneumatic communication with the vacuum. In this implementation, an outlet 117 is defined in frame 115 (FIG. 1) and a suitable passage extends from port 57, to outlet 117, and through a passage 119 pneumatically connected to pressure sensor 59.

The operation of vacuum regulator 21 is apparent from the foregoing description. Regulator 21 is associated with a suitable vacuum source. Vacuum controller 39 receives vacuum from the source and delivers it to the patient and/or the patient's associated medical device. The vacuum being provided is measured by both an electronic gauge 23 and a mechanical gauge 25, and the results of these independent measurements are displayed on combined display face 51. Changes to the vacuum being measured result in changes to the measurements being displayed on both of the gauges.

A number of embodiments of the invention have been described. Nevertheless, it will be understood that various modifications may be made without departing from the spirit and scope of the invention. For example, although much of the description of regulator 21 has focused on its use as a stand alone unit with a wall-mountable housing 27, regulator 21 can assume any number of alternative configurations. Regulator 21 can be part of the built-in vacuum system, could be integrated into an aspirator or portable vacuum system, or could be associated with any number of other medical devices requiring the regulation of vacuum as part of their operations or functions. Furthermore, the two gauges and their associated displays can assume alternate forms, including combining portions of the two associated circuits for measuring the vacuum, combining different types of mechanical and electronic gauges with each other, using two different electronic displays for the two measurements, using two different analog displays for the measurements, or using hybrid gauges and displays having both mechanical and electronic components. Accordingly, other embodiments are within the scope of the following claims.

What is claimed is:

1. A vacuum regulator, comprising:
   an electronic gauge and a mechanical gauge, each adapted to take a measurement associated with a vacuum;
   a digital display associated with the electronic gauge; and
   an analog display associated with the mechanical gauge;
   wherein the displays are secured in relative proximity to each other and oriented to enable a user of the regulator to obtain a reading corresponding to the vacuum from either of the displays.

2. The regulator of claim 1, further comprising a port adapted to receive the vacuum from a vacuum source the source, selected from the group consisting of a hospital vacuum system, an aspirator, and a portable vacuum system.

3. The regulator of claim 1 further comprising an assembly adapted to translate the vacuum into a reading on the analog display.

4. The regulator of claim 3, wherein the analog display includes an indicator and the mechanical gauge includes a movable element, and wherein the assembly includes a rack and pinion operatively connected to the indicator and the movable element to rotate the indicator in response to changes in the vacuum.

5. The regulator of claim 1, further comprising: a housing adapted to be mounted to a wall, the housing having an inlet and an outlet defined therein, the inlet adapted to connect to a vacuum source, the outlet adapted to connect to a vacuum device; a vacuum controller operatively connected between the inlet and the outlet and having a control knob associated therewith, the control knob located proximate to the housing and rotatable to deliver a vacuum; and an outwardly oriented surface defined in the housing; wherein the measurements of both of the gauges are associated with the delivered vacuum; and wherein both of the displays are located to be visible when viewing the outwardly oriented surface.

6. The regulator of claim 1, wherein the electronic gauge includes an electronic circuit for processing signals associated with the vacuum.

7. The regulator of claim 1, wherein the mechanical gauge includes a pneumatic circuit responsive to the vacuum.

8. A vacuum regulator comprising:
an electronic gauge and a mechanical gauge, each adapted to take a measurement associated with a vacuum, the electronic gauge having an electronic circuit for processing signals associated with the vacuum, the mechanical gauge having a pneumatic circuit responsive to the vacuum;
a digital display associated with the electronic gauge, the digital display having a set of digits on an outer surface thereof; and
an analog display associated with the mechanical gauge, the analog display including a gauge face with a vacuum scale and an indicator, the scale and the indicator being movable relative to each other;
wherein the outer surface of the digital display and the gauge face are secured relative to each other to enable a user of the regulator to obtain a reading corresponding to the vacuum from either the set of digits or the indicator.

9. The regulator of claim 8, wherein the electronic gauge includes a circuit board to which the digital display is electrically connected, the circuit board extending behind the gauge face.

10. The regulator of claim 8, wherein the gauge face has portions defining a window therein, the set of digits positioned so as to be visible through the window.

11. The regulator of claim 8, wherein the mechanical gauge includes a rack and pinion assembly, wherein the indicator is physically moveable relative to the vacuum scale, and the pneumatic circuit includes a movable element in pneumatic communication with the vacuum, the rack and pinion assembly being operatively connected to the indicator and the movable element to rotate the indicator in response to changes in the vacuum.

12. The regulator of claim 11, wherein the movable element is enclosed in a movable element housing behind the gauge face, and wherein the circuit board is secured so as to be situated between the movable element housing and the gauge face.

13. The regulator of claim 8, further comprising:
a housing adapted to be mounted to wall, the housing having an inlet and an outlet defined therein, the inlet adapted to connect to a vacuum system, the outlet adapted to connect to a vacuum device;
a vacuum controller operatively connected between the inlet and the outlet and having a control knob associated therewith, the control knob located proximate to the housing and rotatable to deliver a selected vacuum;
an outwardly oriented surface defined in the housing; wherein both of the displays are located to be visible when viewing the outwardly oriented surface.

14. A vacuum regulator comprising:
a vacuum controller in pneumatic communication with a vacuum and adapted to provide a vacuum for medical uses;
an electronic gauge and a mechanical gauge, each adapted to take a measurement of the vacuum, the electronic gauge including an electronic circuit for processing signals associated with the vacuum, the mechanical gauge including a pneumatic circuit responsive to the vacuum;
a digital display associated with the electronic gauge, the digital display having a set of digits on an outer surface thereof;
an analog display associated with the mechanical gauge, the analog display including an indicator and a vacuum scale, the scale and the indicator being movable relative to each other;
wherein the digital display and the indicator are secured relative to each other to enable a user of the regulator to obtain a reading corresponding to the vacuum from either the set of digits or the position of the indicator relative to the scale;
wherein the analog display includes a gauge face, the indicator located to physically move relative to the gauge face, the set of digits and the gauge face having respective outer surfaces secured relative to each other to have substantially the same orientation;
wherein the gauge face has portions defining a window therein, the set of digits located so as to be visible through the window;
wherein the pneumatic circuit includes a movable element in pneumatic communication with the vacuum, the movable element enclosed in a movable element housing behind the gauge face;
wherein the electronic gauge includes a circuit board to which the digital display is electrically connected, the circuit board extending behind and secured relative to the gauge face;
wherein the circuit board is secured so as to be located between the movable element housing and the gauge face.

15. A vacuum regulator, comprising:
a housing adapted to be mounted to a wall, the housing having an inlet adapted to connect to a vacuum system; the housing having portions defining at least one window therein;
a vacuum controller operatively connected to the inlet and having a control knob associated therewith; and
a gauge module located within the housing and in pneumatic communication with the inlet;
wherein the gauge module includes two gauges, and two corresponding displays, each display adapted to display a measurement associated with a vacuum; wherein the gauge module is secured relative to the housing so that the displays are visible through the at least one window.

16. The regulator of claim 15, wherein the gauge module includes a display face positioned in the at least one window of the housing.

17. The regulator of claim 15, wherein one of the displays includes a movable indicator and the other display includes a set of digits on an outer surface thereof, and wherein the indicator and the digits are located to be visible through the at least one window of the housing.

18. The regulator of claim 15, wherein one of the gauges includes a pneumatic circuit and the other of the gauges includes an electronic circuit.

19. The regulator of claim 18, wherein the pneumatic circuit includes a movable element in pneumatic communication with the vacuum.

20. The regulator of claim 19, wherein the gauge module includes a frame, and wherein the electronic circuit includes a pressure sensor in pneumatic communication with the vacuum through an outlet in the frame, whereby vacuum is sensed for measurement by the electronic circuit.

21. The regulator of claim 15, wherein one of the gauges comprises a mechanical gauge and the other of the gauges comprises an electronic gauge.

* * * * *